March 24, 1959     J. T. ZELLERS, JR., ET AL     2,878,621
APPARATUS FOR SUPPORTING SHEET MATERIAL
Filed Jan. 13, 1956     3 Sheets-Sheet 1

INVENTORS
James T. Zellers, Jr. and
BY George F. Ritter, Jr.
Nobbe & Swope
ATTORNEYS March 24, 1959   J. T. ZELLERS, JR., ET AL   2,878,621
APPARATUS FOR SUPPORTING SHEET MATERIAL
Filed Jan. 13, 1956   3 Sheets-Sheet 2

INVENTORS
James T. Zellers, Jr. and
BY George F. Ritter, Jr.
Nobbe & Swope
ATTORNEYS United States Patent Office 2,878,621
Patented Mar. 24, 1959

2,878,621

APPARATUS FOR SUPPORTING SHEET MATERIAL

James T. Zellers, Jr., Charleston, W. Va., and George F. Ritter, Jr., Toledo, Ohio, assignors to Libbey-Owens-Ford Glass Company, Toledo, Ohio, a corporation of Ohio Application January 13, 1956, Serial No. 559,059

3 Claims. (Cl. 49—33)

The present invention relates generally to the supporting of sheet material, and more particularly to an improved apparatus for supporting sheet glass.

Heretofore, rollers or endless moving belts have been used to provide support for and to convey sheet glass from the melting tank and forming rolls to annealing lehrs. This method of supporting and conveying the glass has proven unsatisfactory in that friction or drag between the rolls and the glass has resulted in distortion and in thickness variations of the glass.

It is therefore an important object of the invention to provide a novel apparatus for supporting sheet material above a support surface with relatively little frictional drag.

Another object of the invention is to provide a novel apparatus for eliminating or substantially reducing friction or drag imparted to glass sheet material as it is being moved by conveying means.

A further object of the invention is to provide apparatus for controlling the temperature of hot sheet glass as it is being conveyed from the forming rolls to an annealing lehr.

Other objects and advantages of the invention will become more apparent during the course of the following description, when taken in connection with the accompanying drawings.

In the drawings, wherein like numerals are employed to designate like parts throughout the same:

While the present invention will be described with particular reference to the supporting and temperature-controlling of sheet glass as it is being conveyed from the forming rolls of a glass tank furnace to an annealing lehr, it is adaptable to many other uses involving the handling movement and/or temperature control of sheet material and is not necessarily limited to the production of sheet glass.

Figure 1:
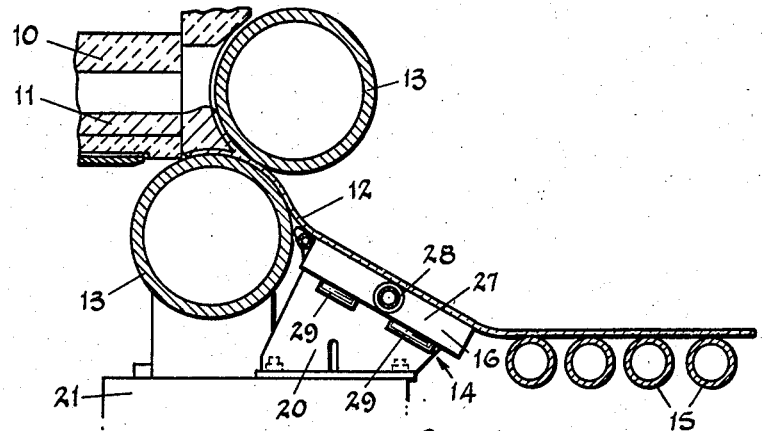
Fig. 1 is a side elevation of the supporting and temperature-controlling apparatus of the invention as oriented in relation to a glass tank furnace and associated forming rolls.

Referring now to the drawings, and in particular to Fig. 1, there is shown a melting tank 10 from which molten glass 11 is drawn into a continuous ribbon or sheet of glass 12 by means of two counter-rotating forming rolls 13 mounted at the end of the tank. The ribbon or sheet of glass 12 after being formed by the wheels 13 then passes over the supporting and temperature-controlling apparatus 14 of the invention which supports the ribbon by a thin layer of air or the like, and thence to conveyor rolls 15 which carry it to appropriate annealing lehrs (not shown) and through further production operations.

Figure 4:
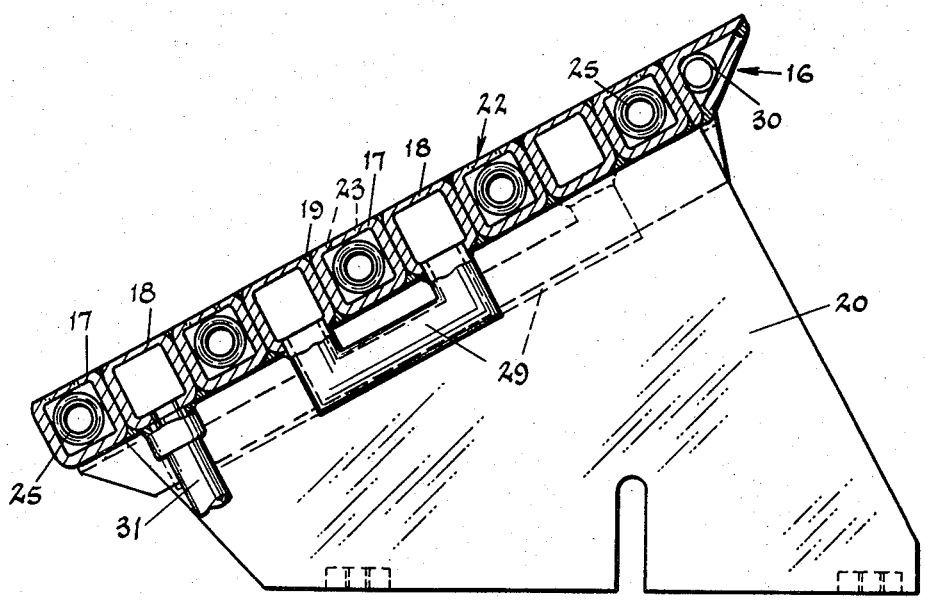
Fig. 4 is a fragmentary sectional view of a side elevation of the apparatus of the invention opposite to the side shown in Fig. 1.
Figure 5:
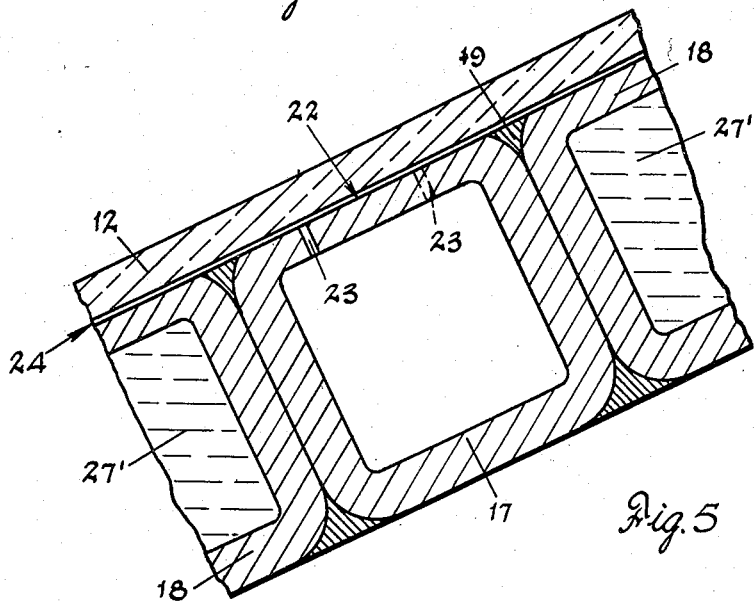
Fig. 5 is an enlarged cross-sectional view of the tubes of the apparatus of the invention.

More particularly as will be seen in Figs. 4 and 5, the supporting and temperature-controlling device 14 comprises an angularly disposed tray 16 formed of a plurality of alternate parallel tubes 17 and 18 welded together in a side by side relation as at 19. The tubes 17 and 18 are mounted on a frame 20 which is secured to a base 21 and have their upper sides and the welds 19 machined to provide a smooth continuous surface 22.

Each of the tubes 17 is provided with a plurality of perforations 23 through which air or other suitable mediums may pass to provide a thin layer 24 (Fig. 5) beneath the sheet 12 as it passes over the tray 16. By providing the thin layer of air, the frictional drag on the sheet as it passes over the tray is substantially reduced and the tendency to distort because of this drag is also reduced. Since the sheet as it comes from the forming rolls, is relatively hot and pliable, uneven frictional contact with the sheet in some cases causes it to become distorted and to contain mar or scratch lines.

Further, because the sheet is separated from the surface 22 of the tray, the amount of heat transferred to the tray by conduction is substantially eliminated thus further aiding in the elimination of distortion problems because of warpage due to uneven or sudden transfers of heat from the relatively hot sheet. In this case, when the thin layer of air or the like 24 is between the sheet and the surface 22 of the tray, the heat transferred is mostly by radiation and therefore is relatively small and gradual.

The air or fluid medium is brought to each of the tubes 17 by suitable conduit pipes 25 which are provided with valves 26 to regulate the air passing to each tube. The conduit pipes 25 are connected to a distribution manifold 27 which is in turn connected to a main supply pipe 28 from a suitable source of air under pressure. Thus by controlling the amount of air through each of the individual conduit pipes 25 by means of the valves 26, the effective thickness of the layer 24 between the sheet and tray surface 22 may be controlled. It will be evident that if one area of the sheet should have a tendency to drag along a particular portion of the tray's surface, that the amount of air passing through the perforations 23 can be increased by suitably adjusting a valve 26.

Figure 2:
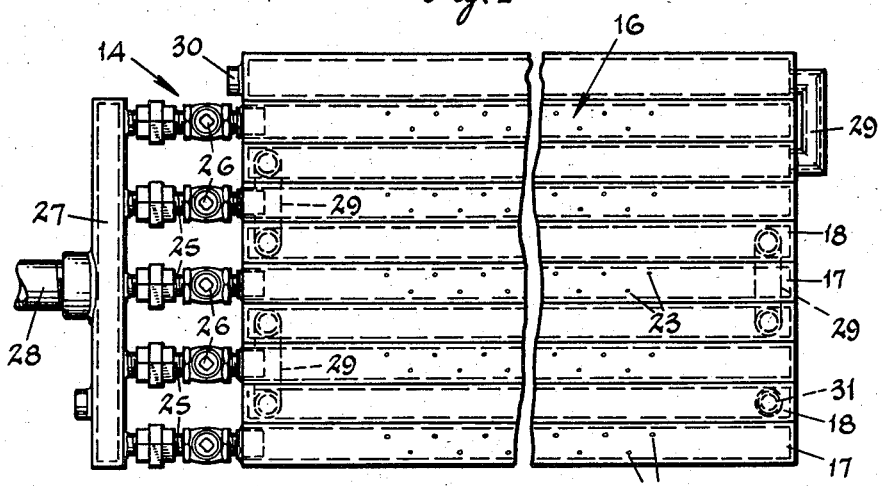
Fig. 2 is a plan view of the supporting and temperature-controlling apparatus shown in Fig. 1 taken perpendicularly to the inclined upper surface of the apparatus.
Figure 3:
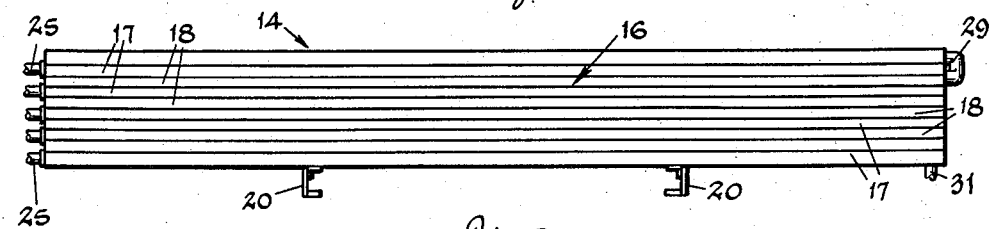
Fig. 3 is a front elevation of the supporting and temperature-controlling apparatus as installed looking toward the forming rolls.

To aid in keeping the air or fluid medium at an optimum temperature, the tubes 18 between the tubes 17 are adapted to carry water or other suitable heat transfer mediums 27'. The respective tubes 18 are interconnected to one another by connecting tubes 29 (Fig. 2) which allow a continuous flow of water or fluid 27' through the tubes. Water or other medium is brought to the tubes by an inlet pipe 30 and away from the tubes by an outlet pipe 31. These pipes of course may be reversed as far as function is concerned and a closed-circuit fluid system may be used or, the tubes may be supplied with fresh fluid depending on particular requirements.

Since the water carrying tubes 18 are spaced between the air tubes 17 and the tubes abut one another, the water passing through tubes 18 will have a heat transfer effect on the air passing through the tubes 17. The temperature of the water will also have a direct effect on the layer of air 24 which is provided between the sheet 13 and the surface 22 of the tray as the tubes are in direct contact with the layer along spaced portions of the surface 22. In some cases, the water tubes 18 may be dispensed with if the problems of heat distortion and heat transfer are not of major importance.

Figure 6:
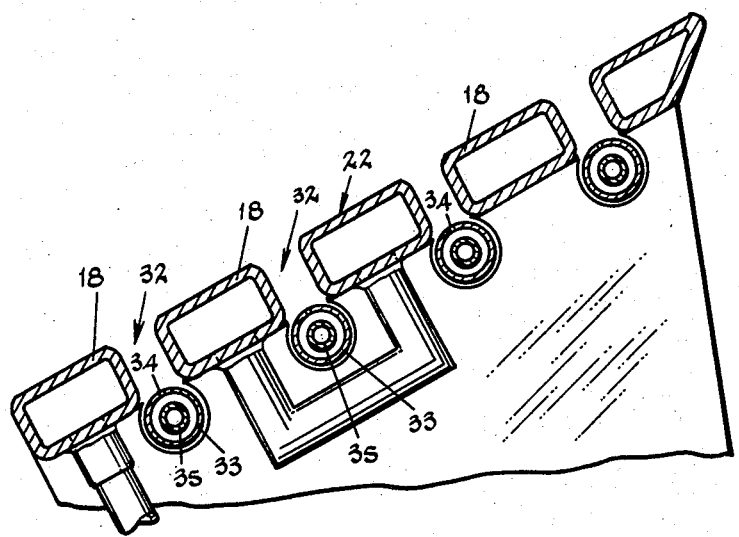
Fig. 6 shows an alternate embodiment of the invention.

An alternate embodiment of the invention is shown in Fig. 6 which differs from the embodiment shown in Figs. 4 and 5 by providing an open space 32 between the tubes 18 which carry the heat transfer medium. In this embodiment air pipes 33 are provided adjacent the bottom of the spaces 32 and are thus spaced from the supporting surface 22 of the tray. These pipes may be connected to a manifold similar to that indicated at 27 in Fig. 2 and the air or fluid medium may be regulated in the same manner.

The air or other medium passes through perforations 34 in the pipes and is directed upwardly toward the sheet passing over or above the surface of the tray to provide the fluid medium cushion. Pipes 35 mounted within the pipes 33 are also adapted to carry a heat transfer medium to regulate the temperature of the air or other fluid medium directed at the sheet. This embodiment has an advantage in some cases in that it does not subject the sheet to concentrated localized pressure jets of the fluid cushioning medium.

Figure 7:
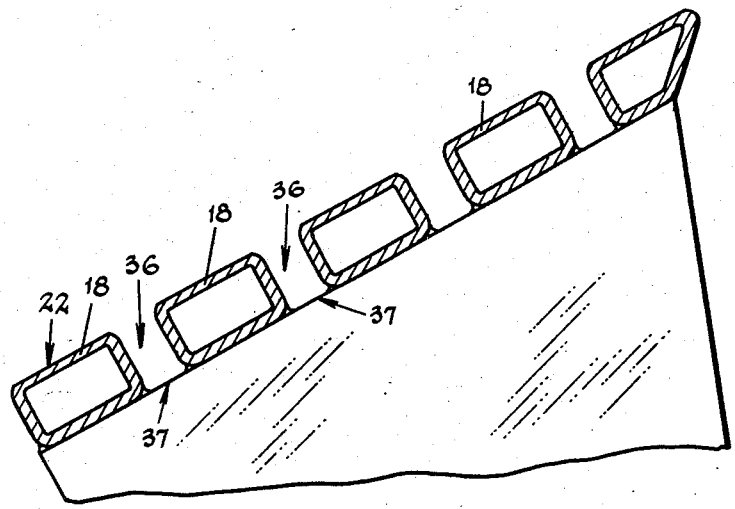
Fig. 7 shows a still further embodiment of the invention.

An additional embodiment of the invention is shown in Fig. 7. This embodiment differs from the previous embodiments principally by not using a fluid pressure medium directed toward the sheet. The heat transfer tubes 18 are spaced from one another to provide channel areas 36 bounded by the tubes 18 and a bottom surface 37. As the hot sheet material or ribbon passes over the tray, it has a tendency to heat the air surrounding it. This heating effect causes the air in the channel areas 36, which are closed by a bottom surface 37, to expand thus causing a lifting effect to be exerted on the sheet. As before, the heat transfer medium carried by the tubes 18 may be controlled to regulate the amount of heat exchange between the tray 22 and the sheet, and to also control the temperature of the air beneath the sheet and in the channel areas 36.

Reviewing now the operation of the invention, as the ribbon of flat glass 12 moves above the tray 16 it is partially or wholly free from actual contact with the tray surface 22 as a result of the layer 24 of air or other fluid medium which forms a cushion between the bottom surface of the sheet and the tray surface. The friction-reducing effect of the air cushion layer 24 may be varied uniformly by the air pressure in the main supply pipe 28 connected to the manifold 27 and/or by the valves 26.

While the sheet or ribbon 13 is being supported by the air cushion or layer as it moves past the tray 16, the temperature of the ribbon and heat transferred from the ribbon may be controlled by the fluid medium passing through the pipes 18. Generally in the case of glass, as the ribbon is received on the tray the temperature of the glass is substantially greater than the temperature of the tray and a heat transfer takes place from the glass to the tray. By keeping the water or other fluid in the pipes 18 at the proper temperature, the amount of heat transferred can be substantially eliminated or controlled to prevent distortion. If the cooling of the ribbon 12 as it passes over the tray is properly controlled, the sheet may be properly hardened to the point where it will be relatively immune to scratches and distortion as it passes onto the conveying rolls 16.

Further control of the friction reducing and heat transfer characteristics of the air layer 24 may be effected by varying the size of the perforations 23 in tubes 17 (Fig. 2) and those in pipes 33 of the embodiment of Fig. 6 and their location with respect to one another to obtain the desired pattern over the surface of the glass as it passes over the tray. Also, whether the layer is to support the ribbon such that the bottom surface thereof partially contacts the tray surface, or such that it is supported completely by the layer is dependent upon the particular operating conditions and the effect desired.

Although temperature and flow control devices have not been shown for the water or other medium passing into the tubes 18, such devices are common and may be used to regulate the optimum temperature and flow of the fluid. In this connection the fluid may be either heated or a refrigerant may be used if it is desirable for a particular application. Also, moisture-laden air may be passed through the perforations 23 and 34 in tubes 17 and pipes 33 so that a steam layer and resultant pressure effect will be produced when the air strikes the relatively hot sheet. This concept can also be utilized in the embodiment of Fig. 7 by assuring that a moisture-laden air is contained in the channel areas 36.

From the above it is believed clear that the present invention provides a means of not only reducing the friction of sheet material as it passes over a surface and the inherent scratches, but also provides a means of eliminating the distortion of the sheet material which results when a temperature differential exists between the sheet material and the surface over which the sheet is being carried. Additionally, the present invention enables the temperature of the sheet material to be regulated to produce particular characteristics in the material. It will of course be evident that a device embodying the concepts herein disclosed may also be used to support sheets in a flat position as well as various angular positions.

It is to be understood that the forms of the invention disclosed herein are to be taken as the preferred embodiments thereof, and that various changes in the shape, size and arrangement of parts may be resorted to without departing from the spirit of the invention or the scope of the following claims.

We claim:

1. An apparatus for supporting sheet glass as it leaves the forming rolls adjacent a glass tank furnace which includes a plurality of adjacent tubes forming a machined surface above or upon which said sheet glass is supported, means for circulating a heat transfer medium through some of said tubes, and means for introducing a fluid medium into the remainder of said tubes, said remaining tubes having perforations along said machined surfaces for permitting said fluid medium to escape from said remaining tubes to form a fluid cushion between said sheet glass and said machined surface of the tubes as it passes thereover.

2. An apparatus for supporting glass as it leaves the forming rolls adjacent a glass tank furnace which includes a plurality of tubes joined in side by side relation with alternate tubes being perforated to form a surface above or upon which said sheet glass is received; a means for supplying to individual, alternate, perforated tubes a fluid in order that a fluid cushion may be maintained between said tube surface and said sheet glass; and means for introducing a heat transfer medium into the remaining tubes of said tube arrangement, said remaining tubes being interconnected at their ends to form a continuous circulation system so that the temperature of said glass sheet can be controlled while above or upon said tube surface.

3. An apparatus for supporting glass on a relatively frictionless cushion and simultaneously controlling the temperature of said sheet glass, which apparatus comprises a plurality of adjacent tubes in side by side relation so that their upper sides form a smooth machined surface upon or above which said sheet glass may be received in a direction transverse to the parallel longitudinal axes of said tubes, an air manifold connected to the ends of alternate tubes, said alternate tubes having openings therein through which air may be introduced into each between the upper surface of each of said tubes and the sheet glass, means for controlling the air entering said tubes, and means for introducing a heat transfer medium into the remaining tubes of said tube arrangement, said remaining tubes being interconnected at their ends to form a continuous circulation system in order that the temperature of said sheet glass may be controlled while above or upon said machined surface.

References Cited in the file of this patent

UNITED STATES PATENTS

| | | |
|---|---|---|
| 887,623 | Gobbe | May 12, 1908 |
| 1,591,179 | Myers | July 6, 1926 |
| 1,622,817 | Waldron | Mar. 29, 1927 |
| 1,827,138 | Brancart | Oct. 13, 1931 |
| 1,828,832 | Drake | Oct. 27, 1931 |